Jan. 19, 1943.  H. C. ICKES  2,308,952
RUBBER VALVE STEM
Filed May 2, 1939

INVENTOR
Howard C. Ickes
BY
ATTORNEY

Patented Jan. 19, 1943

2,308,952

UNITED STATES PATENT OFFICE 2,308,952

RUBBER VALVE STEM

Howard C. Ickes, Akron, Ohio, assignor to The Firestone Tire & Rubber Company, Akron, Ohio, a corporation of Ohio Application May 2, 1939, Serial No. 271,296

6 Claims. (Cl. 152—430)

This invention relates to rubber valve stems such as are used on the inner tubes of pneumatic tire casings.

The invention is of primary utility in its application to the valve stems of tires used on certain makes and sizes of agricultural vehicles, especially tractors. These tractors require additional weight to produce adequate driving traction, said weight conveniently being provided by filling the tires of the vehicle with a suitable liquid. In the winter season, at least, said liquid requires to be of a non-freezing nature, and a calcium chloride solution commonly is used because of its low cost and low freezing point. It is characteristic of calcium chloride, however, to have a corrosive effect upon brass, and when used for the purpose specified it frequently has attacked the brass inserts that contain the valve mechanism in rubber valve stems. As the result of such corrosion, the chemical bond between the metal inserts and the rubber thereabout has been destroyed, and frequently the inserts have been blown entirely out of the rubber stems.

The chief objects of the invention are to provide a valve stem construction of the character mentioned wherein the metal insert will be firmly retained in place against the pressure of liquid within the tire; to provide simple and economical means for retaining the metal insert in place; to provide valve stem insert-retaining means that will resist the corrosive action of liquid within the tire; and to provide valve stem insert-retaining means that will function mechanically even though the chemical bond between the rubber and the metal insert is destroyed. Other objects will be manifest as the description proceeds.

Briefly stated, the invention in the improved rubber valve stem resides in the provision of a local region or zone of rubber under compressive stress, which region is concentric with the axis of the valve stem and circumscribes the metal insert therein.

Figure 1:
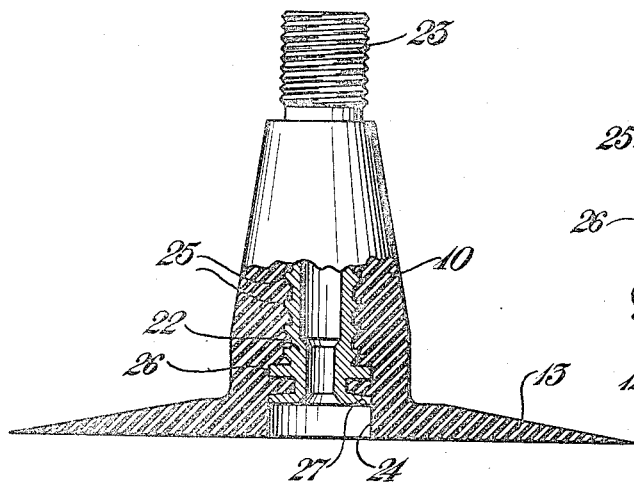
Figure 1 is a diametric section through one embodiment of the invention before the rubber is put under compressive stress, a portion being shown in elevation.
Figure 2:
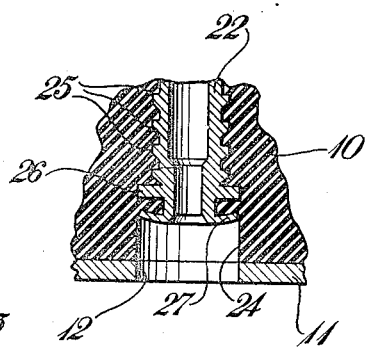
Figure 2 is a detail sectional view of the structure shown in Figure 1, after the rubber is put under compressive stress.

Referring now to Figures 1 and 2 of the drawing, there is shown a rubber valve stem 10 of conventional or preferred design, which valve stem eventually is attached to the usual rubber inner tube 11 concentric with a port or aperture 12 therein, the valve stem comprising the usual base flange 13 that is adhered to said tube structure 11. Vulcanized within the rubber valve stem 10 is an axially disposed, tubular metal insert 22, one end of which is threaded at 23 and projects from the free end of the stem, the other end of the insert being disposed within the stem near the opposite or flanged end of the latter, there being a recess 24 in the rubber structure that exposes the entire inner end of said insert. The major portion of the body of the insert 22 is formed with a longitudinal series of radial flanges 25, 25 that function to provide a mechanical interlock of rubber and metal for assisting in retaining the insert in the stem. Adjacent its inner end the insert 22 is formed with a circumferential radial flange 26 of greater radial extent than the flanges 25, and at its inner end, in spaced relation to flange 26, is a terminal flange 27. The latter is of the same outside diameter as the flange 26, but may be somewhat thinner so as to enable it more readily to be deformed.

The insert 22 and rubber stem 10 are assembled in the usual manner and vulcanized to provide the chemical bond between rubber and metal, the rubber filling the relatively deep circumferential groove in the insert between flanges 26, 27 thereof. After vulcanization the flange 27 is deformed by having its peripheral margin forced toward the flange 26, as shown in Figure 2, with the result that the annular zone or body of rubber composition between said flanges is placed under compressive stress, and thereby adapted to retard corrosion of the contiguous metal parts as hereinbefore explained. Moreover, the deforming of the flange 27 creates a restricted space or neck outwardly of the main body of rubber between the flanges, thus effecting an improved mechanical interlock of rubber and metal that of itself is sufficient to prevent displacement of the insert upon failure of the chemical bond therebetween.

Subsequently the valve mechanism or "insides"

(not shown) is mounted in the insert 22, either before or after the valve stem is assembled with the inner tube 11.

Figure 3:
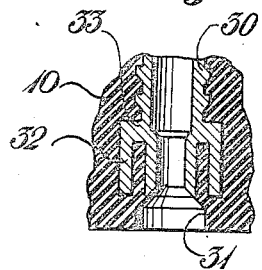
Figure 3 is a fragmentary diametric section through another embodiment of the invention, before the rubber is put under compressive stress.
Figure 4:
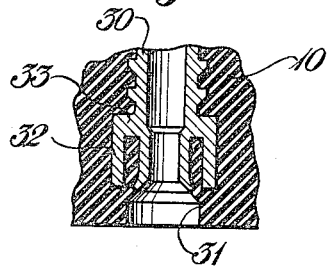
Figure 4 is a sectional view showing the structure of Figure 3 after the rubber is put under compressive stress.

In the embodiment of the invention shown in Figures 3 and 4, the rubber stem 10 has an axial tubular metal insert 30 vulcanized therein, which insert is essentially the same as insert 22 of the previously described embodiment, the distinguishing features thereof being located at its inner end portion. At its inner end the insert 30 terminates at a counter-sunk recess 31 in the rubber stem, the bore of the insert being beveled in continuation of the countersink of the recess. Circumscribing the lower end portion of the insert 30, concentrically thereof and in spaced relation thereto, is an annular flange or skirt portion 32 that is formed integral with the insert, being connected to the latter by means of a wall 33 extending radially inwardly from its upper end.

The insert 30 and rubber stem structure are assembled and vulcanized in the usual manner, the rubber of the stem filling the space circumscribed by the skirt portion 32. After vulcanization, but before the valve stem is adhered to the inner tube 11, the beveled inner end of the insert is spun or otherwise flared or forced radially outwardly to exert compressive stress upon the annular zone of rubber between the flared portion of the insert and the lower end of the skirt portion 32. As in the previously described embodiment of the invention, the compressed zone of rubber not only retards corrosion of the outer surface of the metal insert, but also provides improved mechanical interlock of the rubber and metal.

Figure 5:
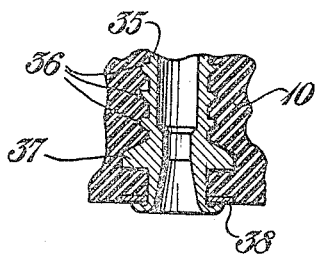
Figure 5 is a fragmentary sectional view of another embodiment of the invention.

In the embodiment of the invention shown in Figure 5, the rubber valve stem 10 has a tubular, axial, metal insert 35 vulcanized therein, the said insert extending completely through the valve stem and having a terminal portion projecting from the inner end of the latter. The insert 35 is formed with a series of flanges 36, 36 identical with those previously described, and near its inner end, but within the rubber structure, is formed with a relatively large and wide circumferential flange 37. The bore of the insert 35 is flared or divergent at its inner end so that the metal thereat is relatively thin. After the rubber of the structure is vulcanized, a metal washer 38 of the same outside diameter as the flange 37 is mounted upon the projecting inner end portion of the insert, and said portion is spun, upset, or riveted over onto the washer 38 with sufficient force to press the latter into the rubber structure until its outer face is flush with the bottom face of the rubber valve stem. The pressing of the washer 38 into the rubber structure puts the annular region or zone of rubber between said washer and the flange 37 under compressive stress with resulting advantages similar to those obtained in other embodiments of the invention.

Figure 6:
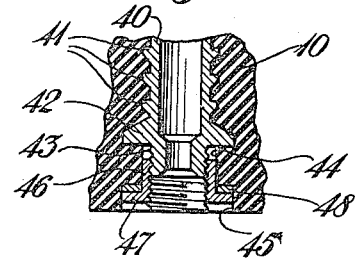
Figure 6 is a fragmentary sectional view of still another embodiment of the invention.

In the embodiment of the invention shown in Figure 6, the rubber valve stem 10 has a tubular, axial, metal insert 40 vulcanized therein, which insert is formed with a series of relatively small flanges 41, 41, and a relatively large flange 42 near the lower end thereof, in which respect the insert is similar to insert 35 of Figure 5. Beyond flange 42 the inner end portion of the insert is exteriorly threaded, as at 43, said threaded portion being disposed wholly within a concentric recess 44 formed in the rubber stem, and spaced from the wall of said recess. The outer end of recess 44 is formed with a counterbore 45 in the bottom face of the rubber stem structure.

Threaded onto portion 43 of the insert 40 is a nut 46 that occupies the space between the insert and the wall of recess 44, said nut having a radial flange or bead 47 on its outer end, which flange is received in counterbore 45. A washer 48 is mounted upon the nut 46 beneath the flange or head 47 thereof. The arrangement is such that when nut 46 is set up or tightened on the insert, the washer 48 is forced into the rubber structure and places the annular zone of rubber between itself and the flange 42 under compressive stress with resulting advantages hereinbefore enumerated.

The invention is of simple and economical construction and achieves the several objects set out in the foregoing statement of objects.

Other modification may be resorted to without departing from the spirit of the invention, or the scope thereof as defined by the appended claims.

What is claimed is:

1. A rubber valve stem comprising a rubber tube, an axially disposed tubular insert vulcanized therein, said insert being integrally formed, at its inner end, with two axially spaced flanges of which the terminal flange is partly exposed, said terminal flange being deformed so as to place the rubber between it and the other flange under compressive stress.

2. A rubber valve stem comprising a rubber tube, an axially disposed tubular insert vulcanized therein, said insert having its inner end exposed at the inner end of the stem, and a tubular skirt disposed concentrically of the insert and integrally connected therewith at its end that is remote from the inner end of the insert, and embedded in rubber interiorly of the stem, the exposed inner end portion of the insert being deformed by being flexed outwardly so as to put the rubber between the deformed inner end of the insert and the skirt thereabout under compressive stress.

3. A rubber valve stem comprising an axially disposed tubular insert vulcanized therein and projecting from both ends thereof, said insert being formed near its inner end with a radially extending flange embedded in the rubber stem, and a washer mounted upon the adjacent projecting end portion of the stem, said end portion being riveted over onto the washer to force the latter into the rubber and thereby to place the rubber between the washer and flange under compressive stress.

4. A rubber valve stem for pneumatic tractor tire inner tubes adapted to contain a corrosive antifreeze fluid, said valve stem comprising a tubular rubber body and an integral rubber base flange for securing same to said inner tube, a tubular metal insert vulcanized to and chemically bonded to said tubular rubber body, portions on said metallic insert adjacent said base flange defining a channel encircling the insert, the rubber of said valve stem body projecting into said channel and being bonded therein, one of said portions being deformed so as to place the rubber in said channel under resilient compression to prevent the antifreeze fluid from entering the channel and destroying the chemical bond between the valve stem body and the insert.

5. A rubber valve stem for pneumatic tractor tire inner tubes adapted to contain a corrosive antifreeze fluid, said valve stem comprising a tubular rubber body and an integral rubber base flange for securing same to said inner tube, a tubular metal insert vulcanized to and chemically bonded to said tubular rubber body, portions on said metallic insert adjacent said base flange defining a channel encircling the insert, the rubber of said valve stem body projecting into said channel and being bonded therein, one of said portions being deformed so as to place the rubber in said channel under resilient compression to prevent the antifreeze fluid from entering the channel and destroying the chemical bond between the valve stem body and the insert.

6. A rubber valve stem for pneumatic tractor tire inner tubes adapted to contain a corrosive antifreeze fluid, said valve stem comprising a tubular rubber body and an integral rubber base flange for securing same to said inner tube, a tubular metal insert vulcanized to and chemically bonded to said tubular rubber body, said insert having an integral outwardly spaced concentric skirt defining an annular channel around the insert, the rubber of said valve stem body projecting into said channel, means chemically bonding the rubber to the channel walls, a portion of the body of the insert being distorted into clamped engagement with the rubber in the mouth of the channel at least whereby to provide fluid sealing means to preclude entrance of bond destroying fluids within the channel.

HOWARD C. ICKES.